United States Patent
Kirby

(10) Patent No.: US 7,255,146 B2
(45) Date of Patent: Aug. 14, 2007

(54) APPARATUS AND METHOD OF ENHANCING RUN-FLAT TRAVEL FOR PNEUMATIC TIRES

(75) Inventor: James M. Kirby, Akron, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 26 days.

(21) Appl. No.: 10/947,896

(22) Filed: Sep. 23, 2004

(65) Prior Publication Data

US 2006/0060281 A1   Mar. 23, 2006

Related U.S. Application Data

(63) Continuation of application No. 10/939,934, filed on Sep. 13, 2004, now abandoned.

(51) Int. Cl.
*B60C 17/00* (2006.01)
(52) U.S. Cl. ....................................... 152/517
(58) Field of Classification Search ................. 152/517
See application file for complete search history.

(56) References Cited

U.S. PATENT DOCUMENTS

| | | | |
|---|---|---|---|
| 4,261,405 A | 4/1981 | Yamauchi et al. | |
| 4,287,924 A * | 9/1981 | Deck et al. | 152/517 X |
| 4,405,007 A | 9/1983 | Welter | |
| 4,779,658 A | 10/1988 | Kawabata et al. | |
| 5,217,549 A | 6/1993 | Johnson | |
| 5,238,040 A | 8/1993 | Ghilardi | |
| 5,309,970 A | 5/1994 | Kawabata et al. | |
| 5,368,082 A | 11/1994 | Oase et al. | |
| 5,413,160 A | 5/1995 | Ghilardi | |
| 5,464,899 A | 11/1995 | Freeman et al. | |
| 5,494,091 A | 2/1996 | Freeman et al. | |
| 5,494,958 A | 2/1996 | Freeman et al. | |
| 5,511,599 A | 4/1996 | Willard, Jr. | |
| 5,526,862 A | 6/1996 | Ghilardi | |
| 5,769,980 A | 6/1998 | Spragg et al. | |

(Continued)

FOREIGN PATENT DOCUMENTS

EP    0 385 192    9/1990

(Continued)

OTHER PUBLICATIONS

Mechanics of pneumatic tires, ed. Samuel Clark, U.S. Dept. of Transportation, Aug. 1981, p. 209.*

*Primary Examiner*—Adrienne C. Johnstone
(74) *Attorney, Agent, or Firm*—James A. Oliff; Thomas R. Kingsbury

(57) ABSTRACT

A pneumatic tire in accordance with an exemplary embodiment of the invention includes a tread portion having a pair of lateral tread edges, a pair of bead portions, a pair of sidewalls that each extend radially from one of the lateral tread edges of the tread portion to one of the bead portions, an inner liner, and a pair of sidewall inserts. Each of the sidewall inserts is disposed between one of the sidewalls and the inner liner. Each of the sidewall inserts includes a top portion and a bottom portion that are each made of high modulus, low hysteresis run-flat stock. Each of the sidewall inserts also includes a center portion made of sidewall stock disposed between the top and bottom portions.

9 Claims, 6 Drawing Sheets

U.S. PATENT DOCUMENTS

| | | |
|---|---|---|
| 6,135,181 A * | 10/2000 | Paonessa et al. ....... 152/517 X |
| 6,182,728 B1 | 2/2001 | Williams et al. |
| 6,397,913 B1 | 6/2002 | Kanenari et al. |
| 6,422,279 B1 | 7/2002 | Williams et al. |
| 6,453,961 B1 | 9/2002 | Colantonio et al. |
| 6,494,242 B2 | 12/2002 | Cottrell |
| 2001/0001971 A1 | 5/2001 | Cottrell |
| 2002/0000279 A1 | 1/2002 | Tobino et al. |
| 2003/0062104 A1 | 4/2003 | Kanenari et al. |
| 2003/0062105 A1 | 4/2003 | Kanenari et al. |
| 2003/0062106 A1 | 4/2003 | Kanenari et al. |
| 2003/0116249 A1 | 6/2003 | Tobino et al. |

FOREIGN PATENT DOCUMENTS

| | | |
|---|---|---|
| FR | 2 469 297 | 5/1981 |
| GB | 2 138 367 | 10/1984 |
| KR | 20000046271 A * | 7/2000 |

* cited by examiner

APPARATUS AND METHOD OF ENHANCING RUN-FLAT TRAVEL FOR PNEUMATIC TIRES

CROSS-REFERENCE

This application is a Continuation application of U.S. Ser. No. 10/939,934, Filed Sep. 13, 2004 now abandoned.

BACKGROUND OF THE INVENTION

1. Field of Invention

The invention relates to pneumatic tires. In particular, the invention relates to an apparatus and method of enhancing run-flat travel for pneumatic tires, and pneumatic tires including such an apparatus.

2. Description of Related Art

The related art includes various apparatus to enable a pneumatic tire (hereinafter "tire") to perform or substantially perform its designed task, such as for use with a vehicle, even after becoming underinflated or non-inflated. Tires can become underinflated or non-inflated for a variety of reasons, such as by being punctured, for example. Under these circumstances, the various related art apparatus provide different levels of performance at different speeds, over different periods of time, and for different types of tires. An exemplary related art apparatus applied to a tire of a vehicle, such as a car, enables an operator (hereinafter "driver") to continue driving after the tire becomes underinflated or non-inflated in relative safety until reaching an appropriate location for repair or replacement.

An exemplary related art apparatus to enable run-flat travel of pneumatic tires is disclosed in U.S. Pat. No. 5,769,980, which is incorporated herein by reference.

SUMMARY OF THE INVENTION

A pneumatic tire in accordance with an exemplary embodiment of the invention includes a tread portion having a pair of lateral tread edges, a pair of bead portions, a pair of sidewalls that each extend radially from one of the lateral tread edges of the tread portion to one of the bead portions, an inner liner, and a pair of sidewall inserts. Each of the sidewall inserts is disposed between one of the sidewalls and the inner liner. Each of the sidewall inserts includes a top portion and a bottom portion. Each of the top and bottom portions is made of high modulus, low hysteresis run-flat stock. Each of the sidewall inserts also includes a center portion that is made of sidewall stock and is disposed between the top and bottom portions.

A pneumatic tire in accordance with another exemplary embodiment of the invention includes a tread portion having a pair of lateral tread edges, a pair of bead portions, a pair of sidewalls that each extend radially from one of the lateral tread edges of the tread portion to one of the bead portions, an inner liner, a belt package disposed radially inward of the tread portion that includes an outer belt having a lateral edge and an inner belt having a lateral edge, and a pair of sidewall inserts. Each of the sidewall inserts is disposed between one of the sidewalls and the inner liner. Each of the sidewall inserts includes a run-flat portion made of high modulus, low hysteresis run-flat stock, and a sidewall portion made of sidewall stock. The run-flat portion is disposed closer to the tread portion than the sidewall portion. At least a part of the run-flat and sidewall portions meet at a location spaced laterally closer to a vertical plane, that extends through a maximum section width point of the tire and parallel to an equatorial plane of the tire, than the lateral edge of the outer belt.

A pneumatic tire in accordance with another exemplary embodiment of the invention includes a tread portion having a pair of lateral tread edges, a pair of bead portions that each include a core and a top end that is the radially most distant point from the core, a pair of sidewalls that each extend radially from one of the lateral tread edges of the tread portion to one of the bead portions, an inner liner, and a pair of sidewall inserts. Each of the sidewall inserts is disposed between one of the sidewalls and the inner liner. Each of the sidewall inserts includes a run-flat portion made of high modulus, low hysteresis run-flat stock, and a sidewall portion made of sidewall stock. The run-flat portion is disposed closer to the core of the bead portion than the sidewall portion. At least a part of the run-flat and sidewall portions meet at a location radially closer to the tread portion than a horizontal plane that extends through the top end of the bead portion and parallel to a normal rim diameter of the tire.

These and other features and advantages of the invention are described in, or are apparent from, the following detailed descriptions of various exemplary embodiments of the systems and methods according to the invention.

BRIEF DESCRIPTION OF THE DRAWINGS

Various exemplary embodiments of systems and methods according to the invention will be described in detail, with reference to the following figures, wherein.

DETAILED DESCRIPTION OF PREFERRED EMBODIMENTS

Figure 1:
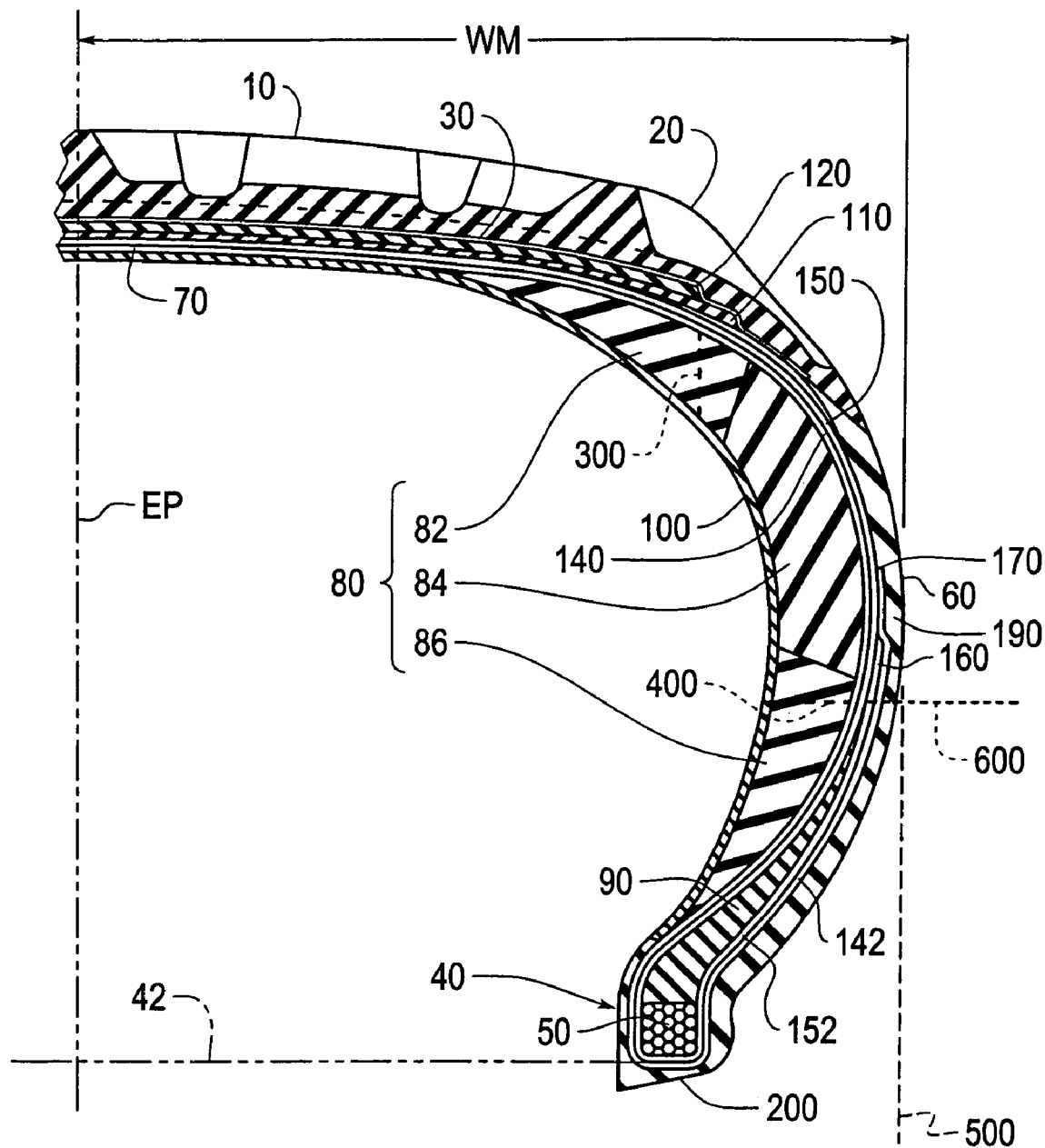
FIG. 1 is a schematic sectional view of a pneumatic tire in accordance with an exemplary embodiment of the invention.

FIG. 1 is a schematic sectional view of a pneumatic tire in accordance with an exemplary embodiment of the invention. As shown in FIG. 1, an exemplary pneumatic tire 1 includes a tread portion 10 having a pair of lateral edges 20, a pair of bead portions 40, a carcass structure 70, and a pair of sidewalls 60. Each of the pair of bead portions 40 can include a bead core 50 and bead filler 90.

The carcass structure 70 can include at least one radial carcass ply. For example, the carcass structure can include an inner ply 140 and an outer ply 150, each extending between the bead cores 50, and through the sidewall portions and the tread portion. The inner and outer plies 140, 150 can turn-up around the bead core 50 to form turned-up portions 142, 152. The carcass plies 140, 150 can each include organic fiber cords, such as polyester cords or rayon cords, for example, and can be arranged at an angle in a 10° range of 85° to 95° (+85° to −85°) with respect to an equatorial plane EP of the tire.

The tread portion 10 has a tread width in which the tire contacts the road, and can be reinforced with a belt package 30. The belt package 30 can include only one belt. Alternatively, the belt package 30 can include two or more belts. In an exemplary embodiment, the belt package 30 includes two belts arranged symmetrically with respect to the equatorial plane EP of the tire, such that a lateral edge 110 of an inner belt extends beyond a lateral edge 120 of an outer belt. Each belt can include inextensible cords, such as steel cords, for example. The steel cords in each belt can be inclined with respect to one another, such that the cords in one belt are crossed at an angle with those in an adjacent belt. The angle of the cords can be in a range of 18° to 30° with respect to the equatorial plane EP.

The bead filler 90 of the bead portion 40 can be arranged radially outwardly from the bead core 50 between the main bodies of the carcass plies 140, 150 and their turned-up portions 142, 152. The bead filler 90 can have a substantially triangular cross-sectional shape.

A turned-up portion of at least one of the carcass plies can end above the upper end of the bead filler 90. In FIG. 1, both turned-up ends 160, 170 of the turned-up portions 142, 152 of the carcass plies 140, 150 extend above the upper end of the bead filler 90, such that both carcass plies 140, 150 completely encompass the bead filler 90. This structure may provide enhanced durability. The turned-up end 160 of the outer ply 150 may end just below the maximum section width WM point of the tire, and the turned-up portion 170 of the inner ply 140 can extend over the turned-up end 160 of the outer ply 150 to end above the maximum section width WM point of the tire.

An inner liner 100 covers an inner surface of the tire 1. The inner liner 100 can be made of any ordinary rubber, such as halogenated butyl rubber, for example.

The axial outer side of the sidewall 60 can be entirely covered with an outer cover rubber 190. The outer cover rubber 190 can be made of a material having excellent bending resistance.

The outer side of the bead portion 40 can be covered with a rubber chafer 200. The rubber chafer 200 can be made of a material having excellent wear resistance.

The sidewall 60 is reinforced with a sidewall insert 80 that can be disposed between the inner carcass ply 140 and the inner liner 100. Thus, the sidewall insert 80 can be placed axially inward of the carcass structure 70. However, the invention is not limited to this disposition of the sidewall insert 80. In other words, the invention is intended to cover any appropriate disposition of the sidewall insert 80.

The sidewall insert 80 may be provided so that it is not reinforced with other additional cord strips or plies. This structure makes the building process less difficult in comparison with tires that use a reinforcing strip or multiple sidewall inserts that are placed in between an inner carcass ply and an inner liner, because placing the reinforcing strip in the sidewall requires that the material be placed flat on the tire building drum during the first stage building process, and then requires shaping after the beads have been set. Further, the reinforcing strips having bias angle cords, for example up to 45°, limit shear forces in the sidewall and increase the spring rate of the tire. Although the uninflated durability of the tire may increase by using such reinforcing strips, the inflated ride quality may be adversely affected.

The sidewall insert 80 can be made of three sections including a top run-flat portion 82, a bottom run-flat portion 86, and a center sidewall portion 84. The top and bottom run-flat portions 82, 86 can be made from a material having a high modulus, low hysteresis and durometer Shore A hardness within a specified range.

Modulus describes the measure of stock hardness/stiffness. The stock used in the top and bottom run-flat portions 82, 86 can be approximately 3 times harder than the stock used in regular sidewalls.

Hysteresis describes the measure of running temperature of a rubber stock. When the tire is running on the road, each component experiences cyclic animation. The sidewall insert 80 and the sidewalls are located between the wheel and the road, and tie the tread 10 and the beads 40 together. Thus, when the tire is running on the road, this sidewall region flexes, and in doing so builds up heat. When a pneumatic tire runs without the support of internal pressure, this flexing and heat build-up can dramatically increase. Harder and/or thicker rubber stocks can typically run at a higher temperature. The run-flat stock, although of high modulus, i.e., approximately 3 times the hardness of regular sidewall stock, in order to carry the loading during 0 psi running, has a low running temperature, such as the same temperature as regular sidewall stock.

The uncured rubber composition of the top and bottom run-flat portions 82, 86 can be a sulfur-vulcanizable rubber composition that is disclosed in U.S. Pat. Nos. 5,494,958, 5,494,091 and 5,464,899. These patents are incorporated herein by reference into this application.

One of the compositions that can be used as the top and bottom run-flat portions 82, 86 for the tire of the exemplary embodiment includes about 25 to 75 parts by weight of a rubbery polymer including at least one of natural rubber and diene (co)polymers, and about 25 to 75 parts by weight of a graft copolymer including an unsaturated polymer backbone including at least one of polyisoprene, diene (co) polymers and EPDM, having pendently grafted thereto a polymerized metal salt of an unsaturated carboxylic acid. The total combined weight of the rubbery polymer and the graft copolymer is 100 parts by weight. The remainder of the uncured rubber composition is, by weight, about 50 to 100 parts of related art or conventional rubber additives per 100 parts by combined weight of the rubbery polymer and the graft copolymer. In an exemplary embodiment, the graft copolymer includes about 60-80% by weight of at least one polymer including polyisoprene and diene (co)polymer and from about 20-40% by weight of polymeric metal salt of α,β-ethylenically unsaturated carboxylic acid. This exemplary rubber compound also includes as one of the related art or conventional rubber additives about 50 to 70 parts by weight of a reinforcing filler per 100 parts by combined weight of rubbery polymer and graft copolymer and at least about 4 parts by weight of a curative including at least one of sulfur and sulfur donors per 100 parts by combined weight of rubbery polymer and graft copolymer. The sulfur-vulcanizable compound is also devoid of peroxide components. In an exemplary embodiment, the polymeric metal salt is poly-zinc dimethyacrylate and the reinforcing filler is carbon black. Further, this rubber compound is also characterized by high compressive flex fatigue, high modulus and low hysterisis, is capable of being worked prior to vulcanization, and has high modulus, low hysterisis properties subsequent to vulcanization.

With regard to physical properties of the rubber compounds, a normalized, mechanical static modulus of the sulfur-vulcanizable rubber compound is in a range from about 1400 psi to 4000 psi at 15% strain subsequent to vulcanization, and in an exemplary embodiment in a range between about 2600 psi and 2800 psi. The hardness range should be about 72 to 97 on Shore A hardness scale, at 23°

C., and in an exemplary embodiment in a range between about 72 and 90. The hysterisis when measured at 100° C., at 10 Hz and 7% deflection, has a tangent Delta (tan δ) of about 0.03 to 0.20, and in an exemplary embodiment between 0.03 and 0.11.

As noted above, the uncured grafted rubber copolymer in an exemplary embodiment includes about 60 to 80% by weight of at least one of the polyisoprene and the diene polymer, and about 20 to 40 parts by weight of the polymeric metal salt of the α,β-ethylenically unsaturated carboxylic acid. The metal salt of the α,β-ethylenically unsaturated carboxylic acid is preferably poly zinc dimethacrylate. One of the related art or conventional rubber additives is a reinforcing filler, which preferably is carbon black.

However, the top and bottom run-flat portions 82, 86 do not have to be made of the above material(s). In fact, the top and bottom run-flat portions 82, 86 can be made of any suitable related art, known or later developed material(s).

The bead filler 90 can be made of the above mentioned compound. In this case, heat generated during uninflated running is reduced or restrained because of its low hysteresis property, and this construction provides further enhanced run-flat durability. Inflated ride characteristics are also enhanced by this construction.

However, the bead filler 90 does not have to be made of this compound. In fact, the bead filler 90 can be made of any suitable related art, known or later developed material(s).

The center sidewall portion 84 can be made of common sidewall stock. The center sidewall portion 84 is located where the tire's vertical flexing occurs during normal inflated operation. Thus, this area has the most dramatic affect on ride harshness. Forming the center sidewall portion 84 of normal sidewall stock addresses the tire's vertical flexing during normal inflated operation, and thus enhances the ride quality of the pneumatic tire 1. Further, the top and bottom run-flat portions 82, 86, which, as discussed above, are made of high modulus, low hysteresis run-flat stock, maintain durability, handling, speed and safety of the tire operating at 0 psi.

However, the center sidewall portion 84 does not have to made of common sidewall stock. In fact, the center sidewall portion 84 can be made of any suitable related art, known or later developed material(s). More specifically, the center sidewall portion 84 can be made of any material that addresses the above and/or other issues.

An exemplary embodiment of the invention provides enhanced durability at certain areas of the tire in order to reduce, minimize or prevent cracks from occurring, such as during 0 psi operation, for example. One such area of enhanced durability is provided at dotted line 300, shown in FIG. 1. The exemplary embodiment shown in FIG. 1 provides enhanced durability to reduce, minimize or prevent a vertical, or substantially vertical, crack from occurring along dotted line 300, directly below the lateral edge of the outer belt 120. If sufficient durability is not provided in this area, the vertical crack could start at the junction of the inner ply 140 and sidewall insert 80, and extend vertically downward through the sidewall insert 80, and ultimately break through the inner liner 100 resulting in failure of the tire.

Another such area of enhanced durability is provided at dotted line 400, shown in FIG. 1. The exemplary embodiment shown in FIG. 1 provides enhanced durability to reduce, minimize or prevent a horizontal, or substantially horizontal, crack from occurring along dotted line 400, which could extend horizontally at the junction of the inner ply 140 and the sidewall insert 80 adjacent the top of the bead filler 90. If sufficient durability is not provided in this area, the horizontal crack could extend inward through the sidewall insert 80 and break through the inner liner 100, thus failing the tire.

In an exemplary embodiment of the invention shown in FIG. 1, the vertical dotted line 300 representing the potential vertical crack extends through the top run-flat portion 82, and the horizontal dotted line 400 representing the potential horizontal crack extends through the bottom run-flat portion 86. Both of these cracks 300, 400 are addressed, prevented from occurring, minimized, or reduced, since the top and bottom run-flat portions 82, 86 are made of high modulus, low hysteresis run-flat stock.

The top run-flat portion 82 and the center sidewall portion 84 meet at a location that is spaced closer to a vertical plane 500, that extends through the maximum section width point WM of the tire 1 and parallel to the equatorial plane EP of the tire, than the lateral edge of the outer belt 120. In fact, at least a part of the top run-flat portion 82 and the center sidewall portion 84 can meet at a location spaced laterally closer to the vertical plane 500 than the lateral edge of the inner belt 110. In an exemplary embodiment, at least a part of the top run-flat portion 82 and the center sidewall portion 84 meet at a location spaced approximately 0.75 inches closer to the vertical plane 500 than the lateral edge of the inner belt 110.

The bottom run-flat portion 86 and the center sidewall portion 84 meet at a location radially closer to the tread portion 10 than a horizontal plane 600 that extends through the top end of the bead filler 90 and parallel to a normal rim diameter 42 of the tire. In an exemplary embodiment, at least a part of the bottom run-flat portion 86 and the center sidewall portion 84 meet at a location spaced approximately 0.5 inches closer to the tread portion 10 than the horizontal plane 600.

The sidewall insert 80 in accordance with the exemplary embodiment discussed above provides advantages over related art run-flat tires. For example, related art run-flat tires, which are entirely made of high modulus, low hysteresis stock, can be objectionable with respect to ride harshness when inflated. The hardness/stiffness of related art sidewall inserts does not provide for normal flexing in the upper sidewall region that occurs in normal tires, i.e., tires that are not run-flat tires. This overall rigidity creates a vibration which results in a noise that can be felt and heard by passengers of a vehicle. In normal tires, i.e., non-run-flat tires, a typical passenger cannot detect the harshness/vibration of the tire during operation. Contrarily, a typical passenger can often detect an objectionable ride harshness/vibration of a related art run-flat tire during inflated operation.

However, the exemplary embodiment of the invention addresses this and/or other issues of related art run-flat tires. For example, the top and bottom run-flat portions 82, 86 provide the strength required at significant areas of the tire requiring strength, such as those indicated by dotted lines 300, 400. Further, the center sidewall portion 84, which can be made of common sidewall stock, and which is located where a significant amount of the tire's vertical flexing occurs during normal inflated operation, reduces, minimizes and/or prevents the hardness/stiffness issues discussed above with regard to the related art run-flat tires.

In the exemplary embodiment shown in FIG. 1, the sidewall insert is crescent shaped. However, the sidewall insert 80 does not have to be crescent shaped, and instead can be formed into any shape to address or achieve the above.

In accordance with the exemplary embodiment discussed above, the top and bottom run-flat portions 82, 86 are disclosed as being formed of a sulfer-vulcanizable rubber composition, and the center sidewall portion 84 is formed of common sidewall stock. However, as discussed above, all portions of the sidewall insert, i.e., the top and bottom run-flat portions 82, 86 and the center sidewall portion 84 can be made of any material to address or achieve the above.

In the exemplary embodiment discussed above, the sidewall insert 80 is disposed between the inner ply 140 and the inner liner 100. However, as discussed above, the sidewall insert 80 does not have to be disposed at this location. Instead, the sidewall insert 80 can be disposed at any location to address or achieve the above.

Figure 2:
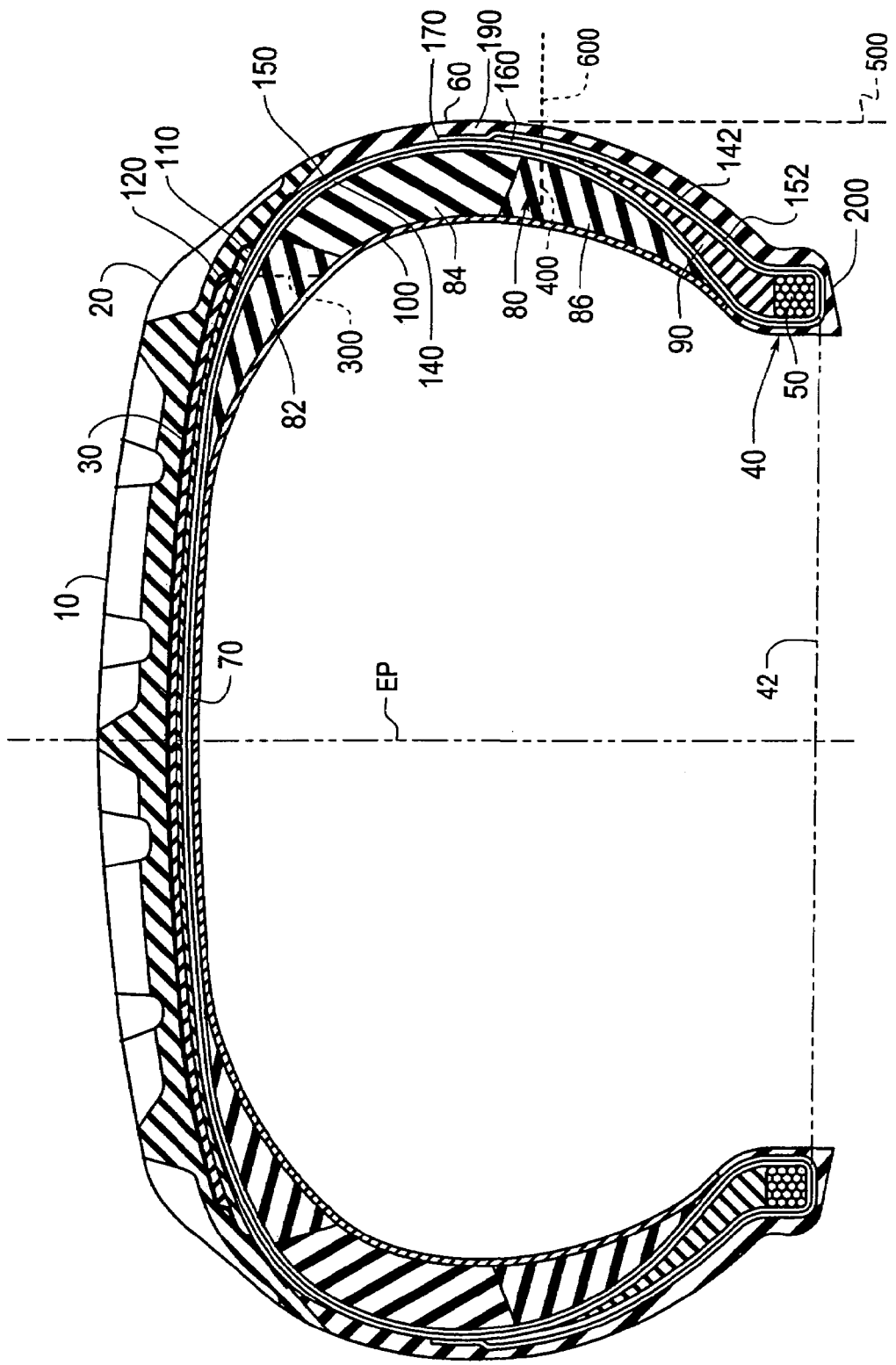
FIG. 2 is another schematic sectional view of the pneumatic tire of FIG. 1.

FIG. 2 is a schematic sectional view of the pneumatic tire of FIG. 1. FIG. 2 is a more complete sectional view that shows both sides of the tire including a pair of sidewall inserts 80.

Figure 3:
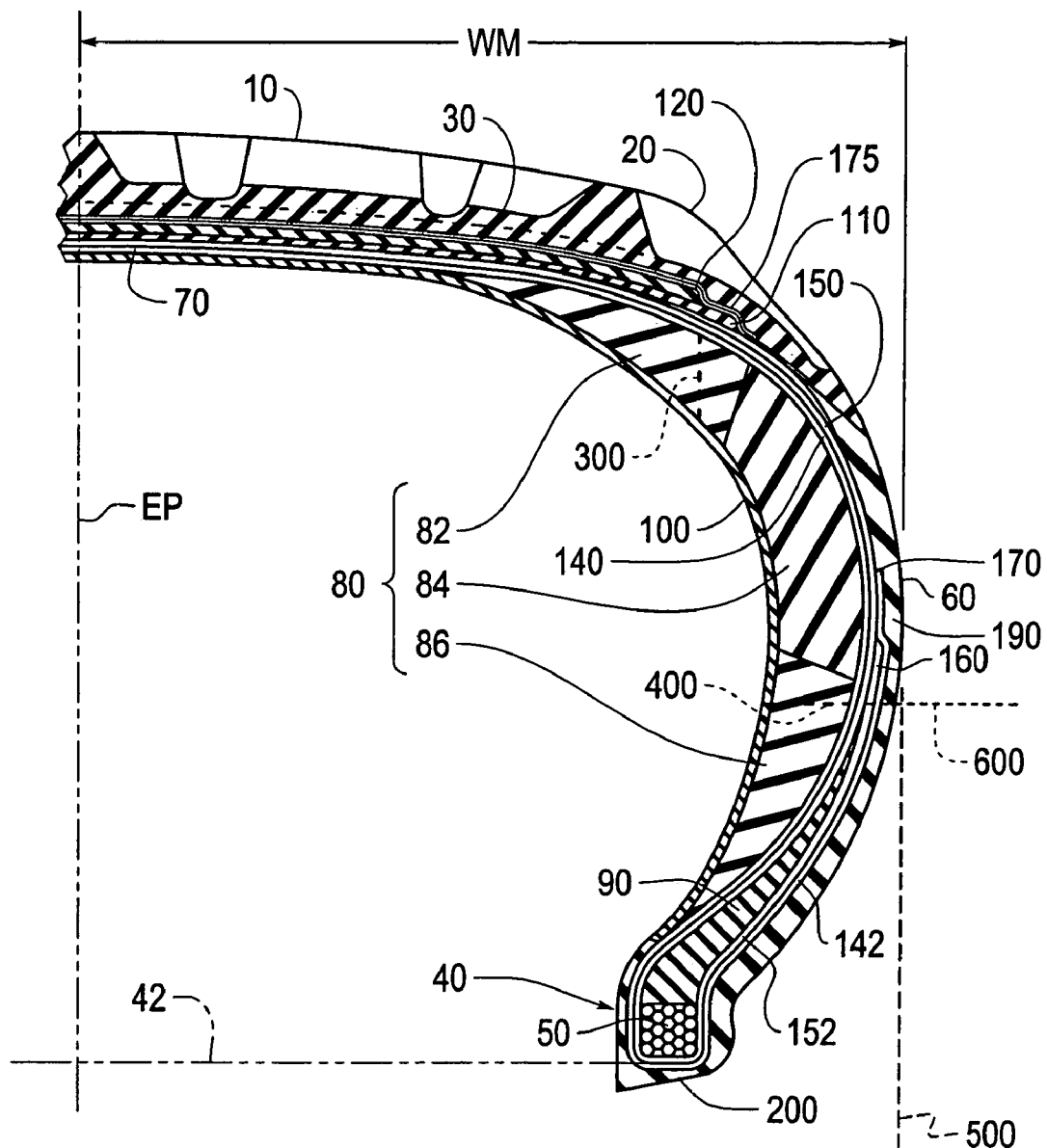
FIG. 3 is a schematic sectional view of a pneumatic tire in accordance with another exemplary embodiment of the invention that includes a cap ply.

FIG. 3 is a schematic sectional view of a pneumatic tire in accordance with another exemplary embodiment of the invention. FIG. 3 is similar to FIG. 1, except that it includes a fabric reinforced cap ply 175 skimmed with a thin layer of rubber.

Figure 4:
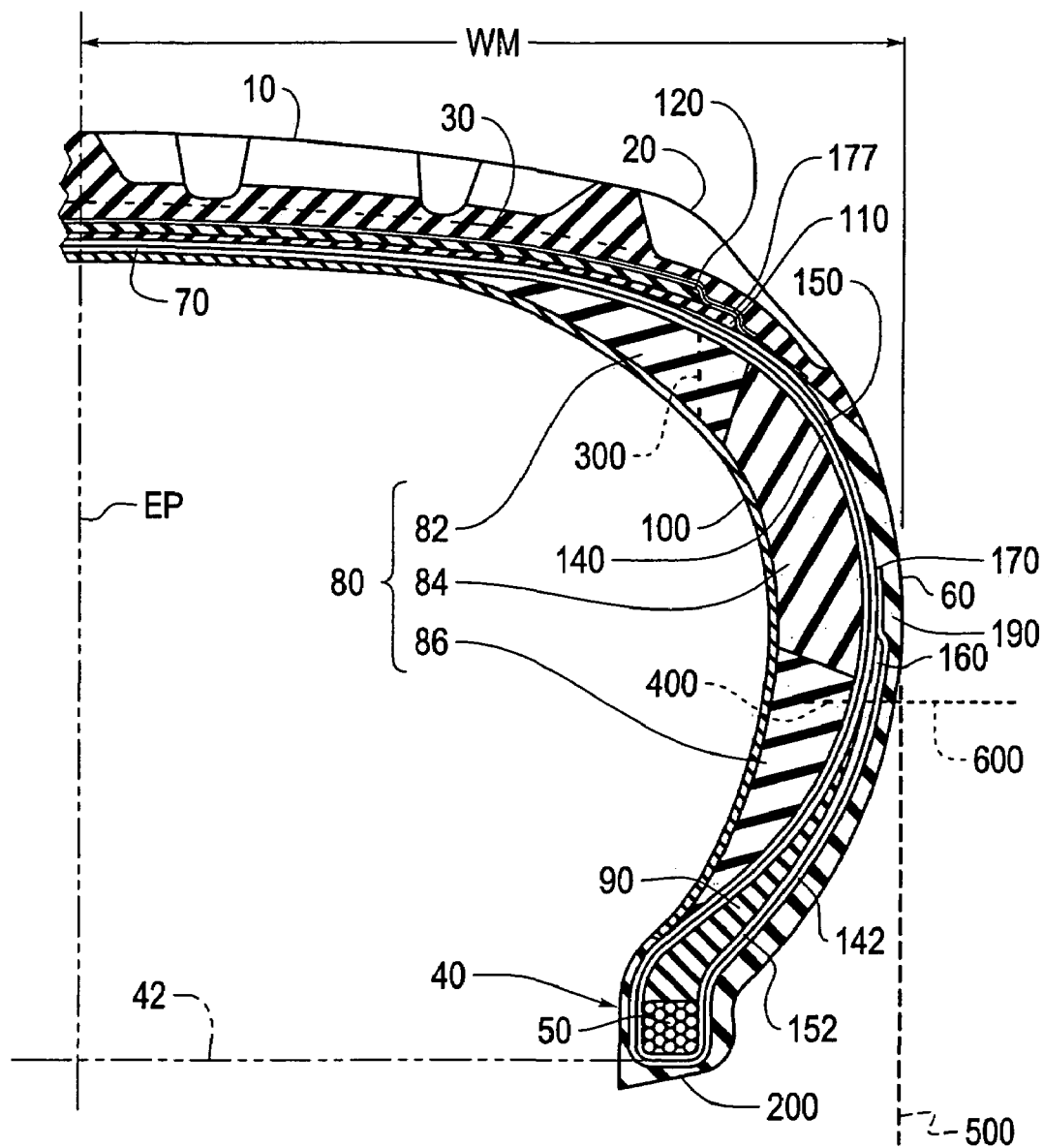
FIG. 4 is a schematic sectional view of a pneumatic tire in accordance with another exemplary embodiment of the invention that includes a cap strip.

FIG. 4 is a schematic sectional view of a pneumatic tire in accordance with another exemplary embodiment of the invention. The exemplary embodiment shown in FIG. 4 is similar to FIG. 1, except that it includes a fabric reinforcing cap strip 177 that may be used alone or in combination with the cap ply 175 shown if FIG. 3.

The exemplary embodiments of FIGS. 3 and 4 show that the exemplary sidewall insert 80 of the invention can be used in other tire structures. In fact, the invention is intended to cover the use of embodiments of the sidewall insert 80 in any related art, known or later developed tire structure.

Figure 5:
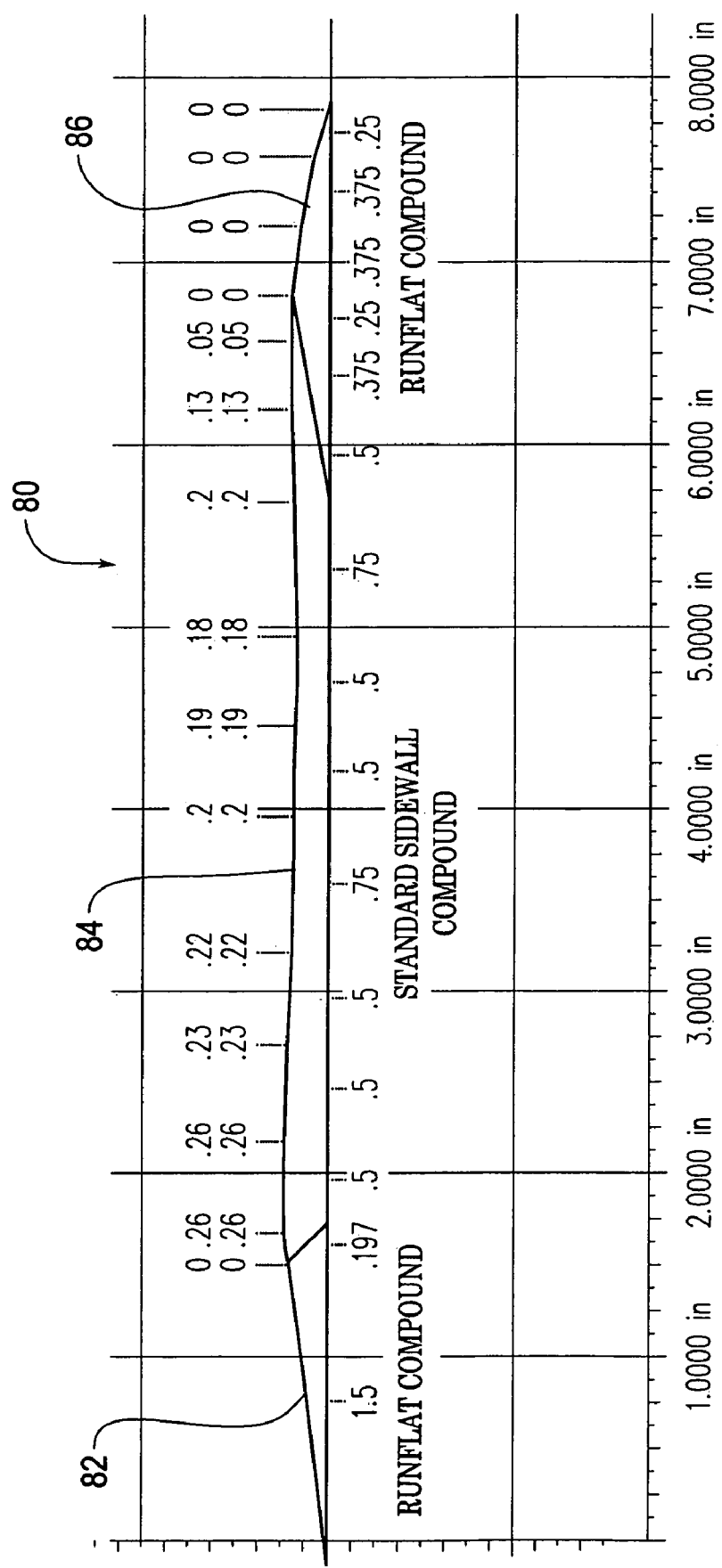
FIG. 5 is a schematic side view of an exemplary embodiment of a sidewall insert.
Figure 6:
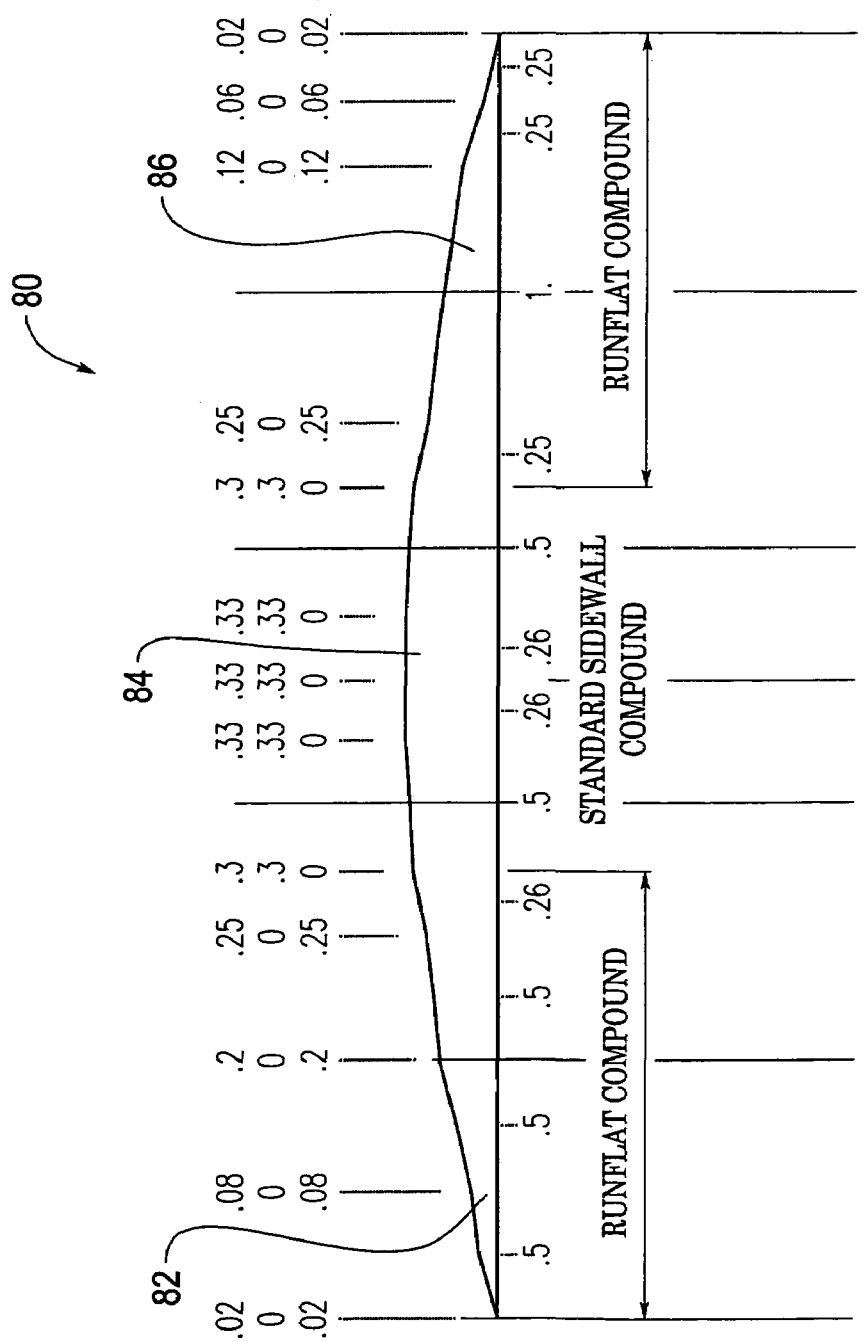
FIG. 6 is a schematic side view of another exemplary embodiment of a sidewall insert.

FIG. 5 is schematic side view of an exemplary embodiment of a sidewall insert 80, and FIG. 6 is a schematic side view of another exemplary embodiment of a sidewall insert 80. In each of FIGS. 5 and 6, the ranges indicated above the sidewall insert 80 relate to the gauge, and the ranges listed immediately below the sidewall insert 80 relate to the graduation. The gauge is the thickness through that point in inches. The graduations are created when a thickness or type of stock change occurs, and are also provided in inches.

However, the ranges shown in both FIGS. 5 and 6 are merely exemplary. The relative locations of where the top and bottom run-flat portions 82, 86 meet the center sidewall portion 84 may or may not change based on the ranges shown in FIGS. 5 and 6. These distances may or may not change because of the tire size, vehicle platform, or any other relative matter.

The sidewall insert 80 may have the same thickness and overall width of related art run-flat inserts, and the only change between the exemplary embodiment sidewall insert 80 and related art run-flat inserts may be in the stock type variation to allow for more flexing in an area that would enhance the inflated ride qualities of the tire and not be detrimental or substantial detrimental to the 0 psi durability. However, as in the related art, the thickness and width of the run-flat insert may vary with the size of the tire and the vehicle platform loads. Thus, as discussed above, the center sidewall portion 84 can be provided in an area that is most important for inflated ride harshness and least important for 0 psi durability. In softening the stock at that location, the exemplary embodiment allows that area to flex to enhance the inflated ride without disturbing 0 psi durability.

As discussed above, the exemplary side views of FIGS. 5 and 6 only show exemplary embodiments. The center sidewall portion 84 does not have to be disposed at the locations shown in FIGS. 5 and 6. The center sidewall portion 84 can meet the top run-flat portion 82 at a location approximately ¼ inch closer to vertical plane 500 than the lateral edge of the inner belt 110, and the center sidewall portion 84 can meet the bottom run-flat portion 86 at a location approximately ¼ inch closer to the tread portion than horizontal plane 600. However, these dimensions are only provided for exemplary purposes.

The thickness of the sidewall insert 80 may also vary based on any number of parameters, such as, for example, the size of the tire and the load carrying requirements. Thus, the invention is intended to cover run-flat inserts 80 of any size and shape.

The center sidewall portion 84 can be joined to the top run-flat portion 82 and the bottom run-flat portion 86 by any related art, currently known or later development method and/or device. For example, these portions can be joined with splices, such as ¼ inch splices at each junction.

The exemplary embodiments of the sidewall insert 80 discussed above each include three discrete portions, i.e., top run-flat portion 82, bottom run-flat portion 86, and center sidewall portion 84. However, the invention is intended to cover other structures, such as sidewall inserts that include fewer than three discrete portions or greater than three discrete portions. In fact, the invention is intended to cover sidewall inserts 80 that do not even include separate discrete portions. For example, the invention is intended to cover sidewall inserts where one material blends into another material. In such an exemplary embodiment, a run-flat portion would not meet a sidewall portion at a discrete location, and instead these portions would be blended together over a certain distance.

The exemplary embodiments discussed above directly relate to vehicle tires, such as car and/or truck tires. However, the invention is intended to cover any type of tire, such as tires for an aircraft, for example. In fact, the invention can even be applied to devices and/or methods not related to tires.

While the systems and methods of this invention have been described in connection with the specific exemplary embodiments outlined above, it is evident that many other alternatives, modifications and variations will be apparent to those skilled in the art. Accordingly, the exemplary embodiments of the systems and methods of the invention, as set forth above, are intended to be illustrative, not limiting. Various changes may be made without departing from the spirit and scope of the invention.

What is claimed is:

1. A pneumatic tire, comprising:
   a tread portion having a pair of lateral tread edges;
   a pair of bead portions, each bead portion including a bead filler;
   a pair of sidewalls, each of the sidewalls extending radially from one of the lateral tread edges of the tread portion to one of the bead portions;
   an inner liner; and
   a pair of sidewall inserts, each of the sidewall inserts being disposed between one of the sidewalls and the inner liner, each of the sidewall inserts including a top portion and a bottom portion, each of the top and bottom portions being made of high modulus, low hysteresis run-flat stock, each of the sidewall inserts also including a homogenous center portion made of sidewall stock disposed between and separating the top and bottom portions, wherein the center portion in each sidewall insert fills a volume formed by the top portion, the bottom portion, the inner liner and said one of the sidewalls.

2. The pneumatic tire according to claim 1, each of the pair of sidewall inserts being substantially crescent shaped.

3. The pneumatic tire according to claim 1, further comprising a belt package disposed radially inward of the tread portion, the belt package including an outer belt having a lateral edge and an inner belt having a lateral edge.

4. The pneumatic tire according to claim 3, each of the sidewall inserts being configured such that at least a part of the top and center portions meet at a location outside, in the axial direction, a vertical plane that extends through the lateral edge of the outer belt, the vertical plane being parallel to an equatorial plane of the tire.

5. The pneumatic tire according to claim 4, each of the sidewall inserts being configured such that at least a part of the top and center portions meet at a location outside, in the axial direction, a vertical plane that extends through the lateral edge of the inner belt, the vertical plane being parallel to an equatorial plane of the tire.

6. The pneumatic tire according to claim 5, each of the sidewall inserts being configured such that at least a part of the top and center portions meet at a location spaced approximately 0.75" outside the vertical plane, in the axial direction.

7. The pneumatic tire according to claim 1, each of the bead portions including a core and a top end that is the radially most distant point from the core.

8. The pneumatic tire according to claim 7, each of the sidewall inserts being configured such that at least a part of the bottom and center portions meet at a location outside, in the radial direction, a horizontal plane that extends through the top end of the bead portion, the horizontal plane being parallel to a normal rim diameter of the tire.

9. The pneumatic tire according to claim 8, each of the sidewall inserts being configured such that at least a part of the bottom and center portions meet at a location spaced approximately 0.5" outside the horizontal plane, in the radial direction.

* * * * *